United States Patent [19]

Hendricks et al.

[11] Patent Number: 4,859,374
[45] Date of Patent: Aug. 22, 1989

[54] SULFOSUCCINAMIDO ACIDS OF POLYOXYPROPYLENEDIAMINES AND THEIR USE AS EMULSIFIERS

[75] Inventors: Udo-Winfried Hendricks, Odenthal; Adolf Schmidt, Cologne, both of Fed. Rep. of Germany

[73] Assignee: Bayer Aktiengesellschaft, Leverkusen, Fed. Rep. of Germany

[21] Appl. No.: 159,764

[22] Filed: Feb. 24, 1988

[30] Foreign Application Priority Data

Mar. 7, 1987 [DE] Fed. Rep. of Germany ....... 3707439

[51] Int. Cl.$^4$ ...................... C07C 143/02; B01F 17/00
[52] U.S. Cl. ..................................... 562/102; 252/355
[58] Field of Search .................................... 260/513 N

[56] References Cited

U.S. PATENT DOCUMENTS 4,490,308 12/1984 Fong et al. ..................... 260/513 N
4,701,284 10/1987 Hendricks et al. ............. 260/513 N Primary Examiner—Alan Siegel
Attorney, Agent, or Firm—Connolly and Hutz

[57] ABSTRACT

Sulfosuccinamido acids and salts thereof corresponding to the following general formula

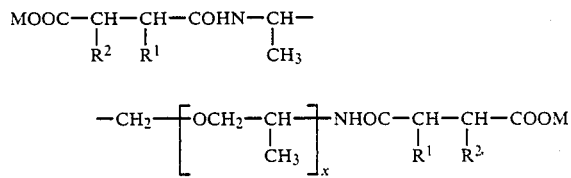

in which
  x is a number of 5 to 60 and preferably 20 to 40,
  M is hydrogen, an alkali metal, an ammonium, $C_1$-$C_4$ alkylammonium or $C_2$-$C_3$ hydroxyalkylammonium groups and, of the substituents $R^1$ and $R^2$, one is hydrogen and the other is —$SO_3M$, and their use as surfactants and emulsifiers in aqueous systems.

2 Claims, No Drawings

SULFOSUCCINAMIDO ACIDS OF POLYOXYPROPYLENEDIAMINES AND THEIR USE AS EMULSIFIERS

This invention relates to sulfosuccinamido acids and salts thereof corresponding to the following general formula

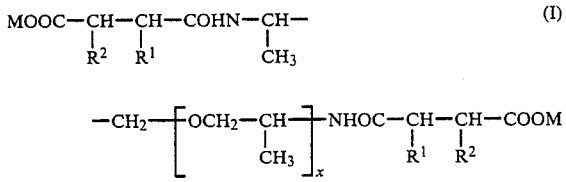

in which
x is a number of 5 to 60 and preferably 20 to 40,
M is hydrogen, an alkali metal, an ammonium, $C_1$-$C_4$ alkylammonium or $C_2$-$C_3$ hydroxyalkylammonium group, and, of the substituents $R^1$ and $R^2$, one is hydrogen and the other is $-SO_3M$.

The invention also relates to the use of the compounds corresponding to formul (I) as surfactants and emulsifiers in aqueous systems, for example in the emulsion polymerization or emulsion copolymerization of radically polymerizable and copolymerizable compounds. Examples of M are sodium, potassium, ammonium, mono-, di- or tri-methylammonium, mono-, di- or tri-(hydroxyethyl)-ammonium and mono- or di-(hydroxypropyl)-ammonium.

The compounds corresponding to formula (I) can be prepared in known manner by reaction of polyoxypropylenediamines corresponding to the following general formula

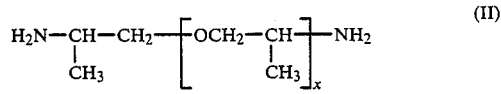

in which x is as defined above, with maleic anhydride at temperature of 20° to 120° C. and preferably at temperature of 40° to 70° C. in a molar ratio of 1:1.9 to 1:2.2 and preferably in a molar ratio of 1:2, and optionally in the presence of inert solvents, followed by reaction of the reaction products obtained in aqueous medium with alkali metals or ammonium sulfites.

The quantity of alkali metal or ammonium sulfite is selected so that 0.95 to 10.5 mole alkali metal or ammonium sulfite is used per mole maleic anhydride used.

Suitable solvents for the reaction of the polyoxypropylenediamines corresponding to formula (II) with maleic anhydride are, for example, aliphatic or aromatic hydrocarbons, more especially toluene and xylene, aliphatic or aromatic halogenated hydrocarbons, such as for example methylene chloride, ethylene chloride or chlorobenzene, esters or ketones, such as for example ethyl acetate or acetone, and ether, such as for example tetrahydrofuran.

The polyoxypropylenediamines are preferably dissolved in the solvents and the maleic anhydride is added to the resulting solutions at the selected reaction temperature.

The polyoxypropylenediamines corresponding to formula (II) are known and may be produced, for example, by dehydrogenating/hydrogenating amination of polyoxypropylene glycols by the methods described in HoubenWeyl, Methoden der Organischen Chemie, 4th Edition, Vol. XI/1, pages 126 et seq. or in DE-PS 1 215 373.

Suitable products are marketed, for example, under the name of JEFFAMINE D by Texaco Chemical Co., Houston, Tex.

The compounds of formula I are particularly suitable as emulsifiers in aqueous emulsion polymerization. They impair the properties of the polymers to a lesser extent than the usual emulsifiers. Since they are of high molecular weight compared with the usual emulsifiers and show extremely good polymer compatibility, they also do no exude so readily from finished articles, such as films or injection molded parts. The clarity of the films and their fogging behavior are improved.

The removal of residual monomers from the polymer latices is also simpler because, in contrast to conventional emulsifiers, the compounds corresponding to formula I do not form stable foam lamellae.

The usual monomers, such as butadiene, styrene, acrylates, methacrylates, vinyl esters, vinyl halides, such as vinyl chloride, chloroprene, ethylene, may be used for polymerization in the presence of the emulsifiers according to the invention. Copolymers of the monomers mentioned with methyl styrene, acrylonitrile, methacrylonitrile, may also be prepared in emulsion in accordance with the invention.

The emulsion polymerization may be carried out discontinuously by feed processes or continuously.

Polymers of butadiene, copolymers of butadiene with styrene or with acrylonitrile, styrene-acrylate copolymer dispersions and acrylonitrile-acrylate copolymer dispersions are produced with particular advantage in accordance with the invention.

If desired, acrylic acid, methacrylic acid, itaconic acid maleic acid and semiesters thereof, vinyl sulfonic acid, methallyl sulfonic acid, may be incorporated in the polymers in quantities of up to 10% by weight in addition to the monomers mentioned to improve the stability of the dispersions to additions of electrolytes and to improve their adhesion and their thickening properties.

In the following Examples, parts are always parts by weight and percent are percent by weight.

EXAMPLE 1

600 parts of a polyoxypropylenediamine corresponding to the following formula

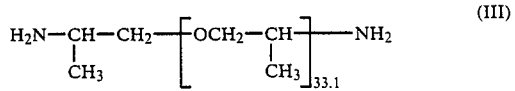

which is marketed by Texaco Inc. under the trade name JEFFAMINE D-2000, were dissolved in 600 parts toluene and 60 parts maleic anhydride added to the resulting solution in portions at 40° to 45° C. After stirring for 1 hour at 70° to 80° C., the toluene was removed by evaporation in vacuo at 60° to 70° C., leaving behind 661 parts of a viscous residue having an acid value of 52.5 mg KOH/g.

1200 parts water and 80 parts sodium sulfite were added to the residue, followed by stirring for 8 hours at 70° to 80° C. until the sulfite content had fallen to 0.26%. The inorganic sulfate content was below 0.3%.

A clear viscous solution having a solids content of 38.3%, which dissolved clearly in water, was obtained.

EXAMPLE 2

100 parts of a polyoxypropylenediamine corresponding to the following formula

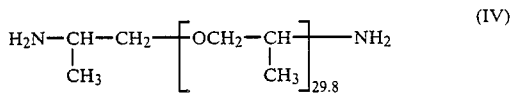

were dissolved in 200 parts toluene and 11 parts maleic anhydride added to the resulting solution at 30° to 35° C. AFter stirring for 1 hour at 70° to 80° C., the solvent was distilled off in vacuo at 60° to 70°0 C. 111 parts of residue having an acid value of 62.0 g KOH/g were obtained.

200 parts water and 16.4 parts sodium sulfite were added to the residue, followed by stirring for 6 hours at 70° to 80° C. until the sulfite content had fallen to 0.23%. A clear viscous solution having a solids content of 38% was obtained.

EXAMPLE 3

288 parts of a polyoxypropylenediamine corresponding to the following formula

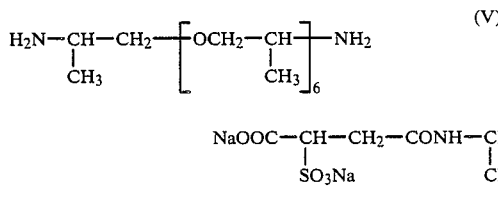

were dissolved in 280 parts toluene, followed by the addition of 134 parts maleic anhydride in portions at 50° to 60° C. After stirring for 1 hour at 70° to 80° C., the toluene was distilled off in vacuo at 70° to 80° C. 423 parts of a viscous residue having an acid value of 185.1 mg KOH/g were obtained.

A solution of 176 parts sodium sulfate in 800 parts water was added to the residue at 60° to 70° C., followed by stirring for 5 hours at 80° to 95° C. A clear viscous solution having a solids content of 43.6%, a sulfite content of 0.04% and an inorganic sulfate content of less than 0.03% was obtained.

EXAMPLE 4

300 parts of a polyoxypropylenediamine corresponding to the following formula

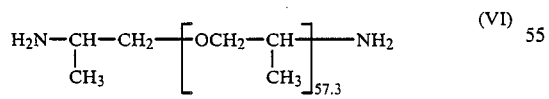

were dissolved in 280 parts toluene and 19.6 parts maleic anhydride added to the resulting solution at 30° to 35° C. After stirring for 1 hour at 70° to 80° C., the solvent was removed in vacuo at 60° to 70° C. 320 parts residue having an acid value of 31.5 mg KOH/g were obtained.

300 parts water and 157 parts isopropanol were added to the residue, followed by the addition with stirring at 70° to 80° C. of 27.7 parts sodium sulfite dissolved in 200 parts water. After stirring for 8 hours at 70° to 80° C., a clear viscous solution having a solids content of 33.7% was obtained. The sulfite content was 0.01%.

The isopropanol was removed from the solution before polymerization, leaving a cloudy, finely divided emulsifier emulsion.

EXAMPLE 5

500 parts of a polyoxpropylenediamine corresponding to the following formula

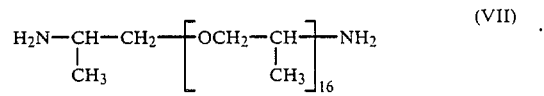

were dissolved in 170 parts toluene and 98 parts maleic anhydride added to the resulting solution at 40° to 60° C. After stirring for 1 hour at 70° to 80° C., the solvent was removed in vacuo at 60° to 70° C., leaving 599 parts of a residue having an acid value of 100.9 mg KOH/g.

A solution of 145 parts sodium sulfite in 900 parts water was added to the residue at 70° to 80° C., followed by stirring for 8 hours at 70° to 80° C. A clear, viscous solution having a solids content of 45.1% and a sulfite content of 0.5% was obtained.

EXAMPLE 6

The compound prepared in accordance with Example 1, which has the following idealized structure

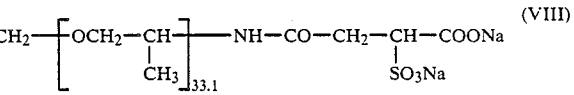

is used as emulsifier in the emulsion polymerization of 1,3-butadiene.

The following constituents (quantities in g) are introduced in the absence of air into a 6 liter fine-steel autoclave in which the internal temperature is automatically regulated through external cooling or external heating and which is provided with an infinitely variable gear for a flat paddle agitator:

| Deionized water | 2032.00 g |
|---|---|
| KOH, solid | 1.78 g |
| 10% by weight aqueous solution of compound (VI) | 546.60 g |
| Tert.-dodecylmercaptan | 5.70 g |
| Butadiene | 1832.0 |

The mixture is heated to 65° C. and, after this temperature has been reached, the polymerization is initiated by addition of 2.5% aqueous potassium peroxodisulfate solution 171.5. Stirring speed: 150 revolutions per minute.

The polymerization showed the following solids content trend as a function of time:

| Time [h] | Solids content latex [% by weight] |
|---|---|
| 1 | 5.2 |
| 2 | 8.1 |
| 3 | 11.1 |
| 4 | 14.2 |
| 5 | 19.0 |
| 6 | 24.0 |
| 7 | 28.5 |
| 8 | 32.1 |

| Time [h] | Solids content latex [% by weight] |
| --- | --- |
| 12 | 38.2 |
| 14 | 40.1 |

By solids content is meant the dry residue of 100 parts by weight of a monomer-free latex sample removed from the autoclave.

Only about 8 kg coagulate is formed during the polymerization, remaining behind after filtration through a 200 micron mesh cloth. The filtered latex is speckle-free, has a solids content of approximately 40% and may readily be demonomerized by vacuum distillation because it does not foam. The particle diameter of the latex is approximately 100 nm.

EXAMPLE 7

The emulsifier prepared in accordance with Example 2, which has the following idealized structure

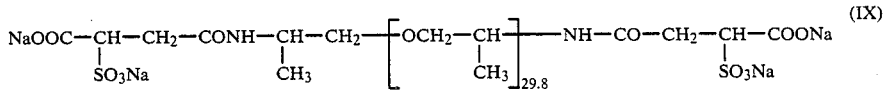

is used in the same manner as in Example 6 for the emulsion polymerization of butadiene.

The polymerization conditions are the same.

The solids content showed the following trend as a function of time during the polymerization:

| Time (h) | Solids content latex (%) |
| --- | --- |
| 1 | 5.0 |
| 2 | 7.5 |
| 3 | 10.5 |
| 4 | 15.5 |
| 5 | 20.5 |
| 6 | 23.5 |
| 8 | 32.5* |
| 10 | 37.5 |
| 12 | 40.0 |

There was no coagulate either in the latex or on the walls of the autoclave. The particle diameter of the latex was measured by nephelometry and came out at approximately 100 nm. After demonomerization by vacuum distillation, during which 10% of the water in the latex was distilled off and replaced by distilled water, the latex had a solids content of 40.6%, a pH value of 11, a flow-out time according to DIN 53 211 (4 mm diameter orifice cup) of 17 seconds. Hardly any coagulate was formed during the demonomerization which took place without foaming.

EXAMPLE 8

The emulsifier prepared in accordance with Example 3, which has the following idealized structure:

The solids content showed the following trend as a function of time:

| Time (h) | Solids content (%) |
| --- | --- |
| 5 | 3.5 |
| 8 | 4.5 |
| 11 | 6.5 |
| 14 | 9.5 |
| 19 | 13.0 |
| 22 | 15.0 |
| 26 | 17.5 |
| 29 | 19.5 |
| 32 | 21.0 |
| 35 | 22.5 |
| 40 | 26.5 |
| 45 | 29.5 |
| 54 | 33.0 |
| 62 | 36.5 |
| 73 | 40.3 |

After demonomerization, the solids content was 40.4%, the flow-out time according to DIN 53 211 (4 mm orifice) 12 seconds and the particle diameter approximately 300 nm. Only a little coagulate was formed during polymerization and demonomerization.

EXAMPLE 9

500 ml glass vessels are filled with the quantities shown in Table 1 of water, styrene or n-butyl acrylate and of the emulsifier solution of Example 2 and soda solution.

The mixtures are heated to 70° C., shaken or stirred. after the temperature has been reached and remains constant, the potassium persulfate solution is added.

After 7 hours, the polymerization are terminated. The solids content, the quantity of coagulate, the pH value and the particle diameter are determined. The results are shown in Table 1.

EXAMPLE 10

The demonomerized latex prepared in accordance with Example 6 is adjusted to a solids content of 40% by weight by addition of a little distilled water.

A latex (40%) correspondingly prepared with potassium persulfate as initiator and using sodium dresinate as emulsifier (particle diameter of the latex approx. 100 nm) is used for comparison (GB-1).

Glass plates are coated with the above latices based on different emulsifiers, a comparable quantity of activator and particle size (wet film thickness 90 microns) using a lacquer dumbell and the wet film applied dried at room temperature. The clear films are then dried at 150° C. in a recirculating air cabinet and their discoloration determined using the color discs made by Hellige GmbH, Freiburg i.Br. (no. 230 069 01).

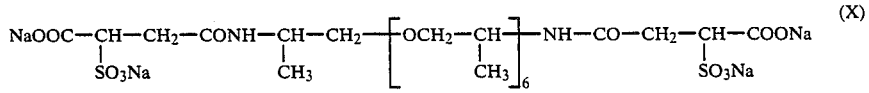

is used in the formulation of Example 4 for the emulsion polymerization of butadiene.

The polymerization conditions are the same.

The color of the colored discs is compared with the colors of the dried clear films against a white background and the color of the film assigned to a certain Hazen value.

The Hazen scale extends from colorless (0) to orange-brown (150).

Test results:
| Heating time (mins.) | 30 mins. | 60 mins. | 120 mins. |
|---|---|---|---|
| Latex of Example 5 | 0–5 | 10 | 25–30 |
| GB-1 latex (dresinate as emulsifier) comparison | 25–30 | 60–70 | 80–90 |

TABLE 1

(Example 9); quantities in [g]

| Deionized water | 181.5 | 181.5 | 171.2 |
|---|---|---|---|
| Styrene | 114.0 | — | — |
| n-Butyl acrylate | — | 114.0 | 114.0 |
| Emulsifier of Example 2, 10% in H$_2$O | 34.2 | 34.2 | 45.6 |
| 1% aqueous potassium peroxo-disulfate solution | 34.2 | → | → |
| 1% aqueous sodium carbonate solution | 20.1 | → | → |
| Polymerization temperature (°C.) | 70 | → | → |
| Polymerization time (h) | 7 | → | → |
| Solids content (%) | 29.1 | 30.3 | 30.5 |
| Coagulate (g) | 0.3 | 0.6 | 0.6 |
| pH-value | 8.3 | 6.3 | 6.4 |
| Latex particle diameter (nm) | 130 | 95 | 100 |

EXAMPLE 11

The mode of action of emulsifiers of the following type:

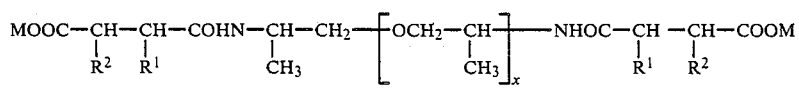

for M=Na$^+$ and x=6; 16; 29.8; 57.3 is compared using the monomers styrene, butyl acrylate, ethyl acrylate, vinyl acetate, vinyl propionate.

The constituents are mixed according to the following formulation:

69.7 g 5% emulsifier solution
95.9 g deionized water
15.4 g sodium carbonate solution, 1%
26.1 g potassium peroxodisulfate solution, 1%
87.1 g monomer The mixtures are stirred or shaken in glass vessels placed in thermostatically controlled baths in an inert gas atmosphere (nitrogen or argon). Polymerization temperature: 70° C.; time: 15 hours.

The polymerization results for the various monomers are shown in Table II:

The type of emulsifier used in the above Example is shown in column 1, the monomer used in column 2, the particle diameter as determined by nephelometry (in nm) in column 3, this particle diameter substantially corresponding to the particle diameter based on the volume average, DAV, the solids content of the latex in column 4 and the quantity of coagulate in g as determined after filtration of the latices through a sieve having a square mesh width of 50 microns in column 5.

Table II shows the monomer-specific effect of the various emulsifiers and also the dependence of the average particle diameter on the structure of the emulsifier.

TABLE II (Example 9)

| | | Particle diameter [nm] | Solids content [%] | Coagulate [g] |
|---|---|---|---|---|
| x = 6 in formula I cf. Example 3 | styrene (S) | 480 | 29.6 | 3.2 |
| | n-butyl acrylate (AB) | 240 | 30.3 | 2.5 |
| | ethyl acrylate (Ea) | 440 | 29.9 | 8.2 |
| | vinyl acetate (Vac) | 1500 | 12.3 | abundant coagulate |
| | vinyl propionate (Vp) | — | 12.4 | abundant coagulate |
| x = 16 in formula I cf. Example 5 | S | 190 | 30.7 | <0.1 |
| | AB | 100 | 30.7 | 0.6 |
| | Ea | 110 | 30.6 | 0.4 |
| | Vac | 300 | — | abundant coagulate |
| | Vp | — | — | coagulated |
| x = 29.8 in formula I cf. Example 2 | S | 160 | 30.2 | <0.1 |
| | AB | 90 | 30.6 | 0.6 |
| | Ea | 90 | 30.6 | 0.5 |
| | Vac | 180 | 30.7 | 2.2 |
| | Vp | 310 | 27.4 | coagulated |
| x = 57.3 in formula I cf. Example 4 | S | — | — | coagulated |
| | AB | 70 | 29.8 | 1.2 |
| | Ea | 90 | 30.8 | 0.6 |
| | Vac | 190 | 29.3 | 6.4 |
| | Vp | 110 | 28.6 | 9.9 |

We claim:

1. Sulfosuccinamido acid and salt thereof corresponding to the following general formula

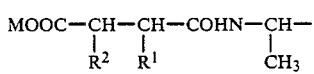

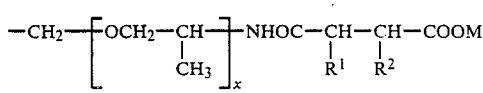

in which
x is a number of 5 to 60
M is hydrogen, an alkali metal, an ammonium, C$_1$–C$_4$ alkylammonium or C$_2$–C$_3$ hydroxyalkylammonium group, and, of the substituents R$^1$ and R$^2$, one is hydrogen and the other is —SO$_3$M.

2. a compound as claimed in claim 1 wherein x represents a number of from 20 to 40.

* * * * *